United States Patent
Nanba et al.

(10) Patent No.: US 9,902,787 B2
(45) Date of Patent: Feb. 27, 2018

(54) POLYTETRAFLUOROETHYLENE POWDER

(71) Applicant: DAIKIN INDUSTRIES, LTD., Osaka-Shi, Osaka (JP)

(72) Inventors: Yoshinori Nanba, Osaka (JP); Dai Fukami, Osaka (JP); Takuya Yamabe, Osaka (JP); Taketo Kato, Osaka (JP); Makoto Ono, Osaka (JP); Takahiro Taira, Osaka (JP); Hirotoshi Yoshida, Osaka (JP); Taku Yamanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/316,032

(22) PCT Filed: Jun. 4, 2015

(86) PCT No.: PCT/JP2015/066237
§ 371 (c)(1),
(2) Date: Dec. 2, 2016

(87) PCT Pub. No.: WO2015/186798
PCT Pub. Date: Dec. 10, 2015

(65) Prior Publication Data
US 2017/0107309 A1  Apr. 20, 2017

(30) Foreign Application Priority Data
Jun. 4, 2014 (JP) .................................. 2014-116293

(51) Int. Cl.
C08F 14/26 (2006.01)
C08J 9/28 (2006.01)

(52) U.S. Cl.
CPC .................................. C08F 14/26 (2013.01)

(58) Field of Classification Search
USPC ........................................... 526/248; 521/65
See application file for complete search history.

(56) References Cited

U.S. PATENT DOCUMENTS

| | | | |
|---|---|---|---|
| 6,046,271 A | 4/2000 | Wu et al. | |
| 6,774,164 B2 | 8/2004 | Lyons et al. | |
| 7,696,268 B2 | 4/2010 | Tsuda et al. | |
| 2005/0038177 A1 | 2/2005 | Hoshikawa et al. | |
| 2007/0135558 A1 * | 6/2007 | Tsuda | C08F 6/16 524/544 |
| 2008/0200571 A1 * | 8/2008 | Higuchi | C08F 2/26 521/65 |
| 2009/0253854 A1 | 10/2009 | Xu et al. | |
| 2017/0096504 A1 | 4/2017 | Nanba et al. | |
| 2017/0107368 A1 | 4/2017 | Nanba et al. | |

FOREIGN PATENT DOCUMENTS

| | | |
|---|---|---|
| EP | 0 248 446 A2 | 12/1987 |
| EP | 2918613 A1 | 9/2015 |
| EP | 2927247 A1 * | 10/2015 |
| JP | 49-27587 A | 3/1974 |
| JP | 63-81104 A | 4/1988 |
| JP | 10-513497 A | 12/1998 |
| JP | 2001-040043 * | 2/2001 |
| JP | 2001-040043 A | 2/2001 |
| JP | 2003-500495 A * | 1/2003 |
| JP | 2009-155558 A | 7/2009 |
| JP | 2010-180364 A | 8/2010 |
| JP | 2012-513530 A | 6/2012 |
| JP | 2012-513532 A | 6/2012 |
| WO | 96/24625 A2 | 8/1996 |
| WO | 00/71590 A1 | 11/2000 |
| WO | 2005/042593 A1 | 5/2005 |
| WO | 2007/046345 A1 | 4/2007 |
| WO | 2010/075359 A1 | 7/2010 |
| WO | 2010/075494 A1 | 7/2010 |
| WO | WO-2014/084399 A1 * | 6/2014 |

OTHER PUBLICATIONS

International Preliminary Report on Patentability dated Dec. 6, 2016 from the International Bureau in counterpart application No. PCT/JP2015/066211.
International Preliminary Report on Patentability dated Dec. 6, 2016 from the International Bureau in counterpart application No. PCT/JP2015/066210.
International Search Report for PCT/JP2015/066210, dated Sep. 8, 2015.
International Search Report for PCT/JP2015/066211, dated Jun 30, 2015.
International Search Report for PCT/JP2015/066237, dated Sep. 8, 2015.

(Continued)

*Primary Examiner* — Mark Kaucher
*Assistant Examiner* — Henry Hu
(74) *Attorney, Agent, or Firm* — Sughrue Mion, PLLC

(57) ABSTRACT

The present invention provides a polytetrafluoroethylene powder having high dispersibility in lubricants. The polytetrafluoroethylene powder includes polytetrafluoroethylene containing a tetrafluoroethylene unit alone or a tetrafluoroethylene unit and a modifying monomer unit based on a modifying monomer copolymerizable with the tetrafluoroethylene, and has a specific surface area of 32 $m^2/g$ or larger.

17 Claims, No Drawings

(56) References Cited

OTHER PUBLICATIONS

International Preliminary Report on Patentability dated Dec. 6, 2016 from the International Bureau in counterpart application No. PCT/JP2015/066237.
Communication dated Jun. 6, 2017 from U.S. Patent & Trademark Office in counterpart U.S. Appl. No. 15/316,031.
Communication dated Aug. 3, 2017, from the European Patent Office issued in EP Appln. No. 15802859.7.
Office Action dated May 10, 2017, which issued in prosecution of U.S. Appl. No. 15/316,024.
Communication dated Oct. 26, 2017, from European Patent Office in counterpart application No. 15803136.9.
Communication dated Nov. 22, 2017 issued by the European Patent Office in counterpart application No. 15803131.0.

* cited by examiner

POLYTETRAFLUOROETHYLENE POWDER

TECHNICAL FIELD

The present invention relates to polytetrafluoroethylene powder.

BACKGROUND ART

Polytetrafluoroethylene has characteristics of excellent chemical durability as well as good smoothness, and thus is used as, for example, an additive to be added to grease requiring lubrication.

Patent Literature 1 discloses a powder of low-molecular-weight polytetrafluoroethylene containing a tetrafluoroethylene unit alone or a tetrafluoroethylene unit and a modifying monomer unit copolymerizable with the tetrafluoroethylene unit, wherein the low-molecular-weight polytetrafluoroethylene has an average primary particle size of 100 nm or smaller.

Since this powder has a small average primary particle size, it is dispersed with a small dispersed particle size when used as an additive for matrix material. Such a powder absorbs a large amount of oil, providing stable fine dispersion. Thus, the powder has a good effect of modifying the surface of the matrix material (for example, improving the texture of the coating surface), leading to reduction in the amount of the powder itself to be added.

CITATION LIST

Patent Literature

Patent Literature 1: JP 2010-180364 A

SUMMARY OF INVENTION

Technical Problem

Still, there is a demand for polytetrafluoroethylene powder having good dispersibility in lubricants.

In view of the above state of the art, the present invention aims to provide a polytetrafluoroethylene powder having better dispersibility in lubricants.

Solution to Problem

The inventors performed various studies to find that a polytetrafluoroethylene powder having a specific surface area of 32 $m^2/g$ or larger can have improved dispersibility in lubricants, completing the present invention.

Specifically, the present invention relates to a polytetrafluoroethylene powder including polytetrafluoroethylene containing a tetrafluoroethylene unit alone or a tetrafluoroethylene unit and a modifying monomer unit based on a modifying monomer copolymerizable with the tetrafluoroethylene, the powder having a specific surface area of 32 $m^2/g$ or larger.

The specific surface area of the polytetrafluoroethylene powder of the present invention is preferably 35 $m^2/g$ or larger.

The polytetrafluoroethylene powder of the present invention is preferably formed from polytetrafluoroethylene particles having a volume average particle size of 50 nm or smaller.

The polytetrafluoroethylene powder of the present invention is preferably formed from polytetrafluoroethylene particles having a volume average particle size smaller than 20 nm.

Advantageous Effects of Invention

Since the polytetrafluoroethylene powder of the present invention has the aforementioned configuration, it has high dispersibility in lubricants. Thus, use of the polytetrafluoroethylene powder of the present invention leads to grease excellent in properties such as load bearing.

DESCRIPTION OF EMBODIMENTS

The present invention is described in detail below.

The polytetrafluoroethylene (PTFE) powder of the present invention is characterized by a specific surface area of 32 $m^2/g$ or larger.

The specific surface area is preferably 33.5 $m^2/g$ or larger. The specific surface area is more preferably 35 $m^2/g$ or larger. The specific surface area is still more preferably 40 $m^2/g$ or larger.

The specific surface area can be measured using an automatic specific surface area measurement instrument (BELSORP-mini, Bel Japan, Inc.). In the measurement, an adsorption isotherm is obtained by nitrogen gas adsorption under the condition of liquid nitrogen temperature. The isotherm is BET-analyzed, and thereby the specific surface area is determined.

The PTFE powder is preferably formed from PTFE particles. The PTFE particles preferably have a volume average particle size of not smaller than 0.1 nm but not greater than 50 nm. The particles having a volume average particle size within the above range can be significantly finely dispersed in a matrix material.

The volume average particle size is more preferably not smaller than 0.5 nm, still more preferably not smaller than 1.0 nm, while more preferably not greater than 20 nm, still more preferably smaller than 20 nm, further more preferably smaller than 15 nm, much more preferably not greater than 10 nm, particularly preferably smaller than 5 nm, most preferably smaller than 3 nm. PTFE powder having a volume average particle size of smaller than 0.1 nm is not easy to produce.

The volume average particle size is determined by dynamic light scattering. In the determination, a PTFE aqueous dispersion with a PTFE solid content of 1.0 mass % is prepared. The value is determined using ELSZ-1000S (Otsuka Electronics Co., Ltd.) at 25° C. with 70 accumulations. The applied refractive index of the solvent (water) is 1.3328 and the viscosity of the solvent (water) is 0.8878 mPa·s. The volume average particle size is the average particle size of the particles dispersed in the state of primary particles.

In view of the handleability, the PTFE powder preferably has an average particle size of 1 to 50 μm, more preferably 2 to 40 μm. Powder having an average particle size of smaller than 1 μm has a low apparent density, so that it is likely to swirl, resulting in poor handleability. Powder having an average particle size of larger than 50 μm is less likely to be dispersed finely in matrix material, easily causing masses of PTFE in the matrix material.

The average particle size is considered to be equal to the particle size corresponding to a value of 50% of the cumulative volume in the particle size distribution determined using a laser diffraction type particle size distribution analyzer (for example, a product from Japan Laser Corp.) at a pressure of 0.1 MPa and a measurement time of three seconds without cascade impaction.

The PTFE powder is formed from PTFE containing a tetrafluoroethylene unit alone or a tetrafluoroethylene unit and a modifying monomer unit based on a modifying monomer copolymerizable with the tetrafluoroethylene. The "TFE unit" used herein is, for example, a moiety (—CF$_2$—CF$_2$—) derived from TFE.

The PTFE may be a homo-PTFE or a modified PTFE. The modified PTFE includes a TFE unit and a modifying monomer unit based on a modifying monomer copolymerizable with TFE. The PTFE may be a non-melt-fabricable, fibrillatable high molecular weight PTFE or a melt-fabricable, non-fibrillatable low molecular weight PTFE. The "modifying monomer unit" used herein means a moiety of the molecular structure of a modified PTFE which is derived from the modifying monomer. The term "all the monomer units" herein means all of the moieties derived from any monomers in the molecular structure of the modified PTFE.

The PTFE has a melt flow rate (MFR) of not lower than 0 g/10 min but lower than 80 g/10 min. The MFR is preferably not higher than 30 g/10 min, more preferably not higher than 10 g/10 min, still more preferably not higher than 5 g/10 min.

A low MFR means a high molecular weight of PTFE. The PTFE powder is characterized by a high molecular weight as well as a significantly small particle size.

The MFR is a value obtained as the mass (g/10 min) of the polymer flowed out of a nozzle (inner diameter: 2 mm, length: 8 mm) per 10 minutes using a melt indexer (Yasuda Seiki Seisakusho Ltd.) in conformity with ASTM 01238 at 380° C. and 5 kg load.

The PTFE has a melting point of 324° C. to 360° C. The melting point is preferably 350° C. or lower, more preferably 348° C. or lower.

The melting point herein is a temperature corresponding to the local maximum on a heat-of-fusion curve obtained by heating 3 mg of a sample having no history of being heated up to 300° C. or higher using a differential scanning calorimeter (DSC) at a temperature-increasing rate of 10° C./min.

The PTFE has an initial pyrolysis temperature of 400° C. or higher. The initial pyrolysis temperature is preferably 420° C. or higher, more preferably 430° C. or higher.

The initial pyrolysis temperature herein is a temperature at which the amount of a sample is reduced by 1 mass % when 10 mg of the sample is heated from room temperature at a temperature-increasing rate of 10° C./min using a thermogravimetric-differential thermal analysis (TG-DTA) device (trade name: TG/DTA6200, Seiko Instruments Inc.).

The PTFE contains a tetrafluoroethylene unit alone or a tetrafluoroethylene unit and a modifying monomer unit based on a modifying monomer copolymerizable with the tetrafluoroethylene.

The modifying monomer may be any monomer copolymerizable with TEE. Examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkylethylenes; ethylene; and nitrile group-containing fluorine-containing vinyl ethers. These modifying monomers may be used alone or in combination.

Any perfluorovinyl ether may be used, and examples thereof include unsaturated perfluoro compounds represented by the following formula (6):

$$CF_2=CF-ORf^8 \qquad (6)$$

wherein Rf$^8$ is a perfluoro organic group. The term "perfluoro organic group" herein means an organic group in which all the hydrogen atoms bonded to the carbon atoms are replaced by fluorine atoms. The perfluoro organic group may have ether oxygen.

Examples of the perfluorovinyl ether include perfluoro (alkyl vinyl ethers) (PAVE) represented by the formula (6) wherein Rf$^8$ is a C1-C10 perfluoroalkyl group. The perfluoroalkyl group preferably has 1 to 5 carbon atoms.

The perfluoroalkyl group in the PAVE may be a perfluoromethyl group, a perfluoroethyl group, a perfluoropropyl group, a perfluorobutyl group, a perfluoropentyl group, or a perfluorohexyl group, for example. Preferred is perfluoropropyl vinyl ether (PPVE) in which the perfluoroalkyl group is a perfluoropropyl group.

Examples of the perfluorovinyl ether further include those represented by the formula (6) wherein Rf$^8$ is a C4-C9 perfluoro(alkoxyalkyl) group; those represented by the formula (6) wherein. Rf$^8$ is a group represented by the following formula:

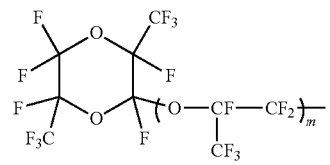

where m is 0 or an integer of 1 to 4; and those represented by the formula (6) wherein Rf$^8$ is a group represented by the following formula:

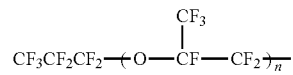

where n is an integer of 1 to 4.

Any perfluoroalkyl ethylene may be used, and examples thereof include perfluorobutyl ethylene (PFBE) and perfluorohexyl ethylene (PFHE).

The nitrile group-containing fluorine-containing vinyl ether is more preferably a fluorine-containing vinyl ether represented by CF$_2$=CFORf$^9$CN (wherein Rf$^9$ represents a C2-C7 alkylene group in which an oxygen atom may optionally be inserted between two carbon atoms). Examples of the nitryl group-containing fluorine-containing vinyl ether include perfluoro[3-(1-methyl-2-vinyloxy-ethoxy)propionitrile] (CNVE).

The modifying monomer in the modified PTFE is preferably at least one selected from the group consisting of HFP, CTFE, VDF, PPVE, PFBE, CNVE, and ethylene. It is more preferably at least one monomer selected from the group consisting of HFP, CNVE, and CTFE.

The modified PTFE preferably includes 0.001 to 2 mol %, more preferably 0.001 to 1 mol %, of the modifying monomer unit relative to all the monomer units.

The amount of each monomer constituting the PTFE herein can be calculated by appropriate combination of NMR, FT-IR, elemental analysis, and X-ray fluorescence analysis in accordance with the type of the monomer.

The PTFE is preferably not a fluorinated ionomer because it is difficult to apply a fluorinated ionomer to the use of the PTFE powder to be mentioned later.

The PTFE preferably has an equivalent weight (EW) of not less than 6,000. The equivalent weight (EW) is a dry weight per equivalent of an ion-exchange group. A high equivalent weight (EW) of the PTFE indicates that the monomers constituting the PTFE hardly include an ionomer. Even though the PTFE hardly includes an ionomer, it has a large specific surface area. The equivalent weight (EW) is more preferably not less than 10,000. The upper limit may be any value, and is preferably not more than 50,000,000.

The equivalent weight can be determined as follows.

The PTFE in the aqueous dispersion containing PTFE particles is coagulated using hydrochloric acid or nitric acid. The coagulated PTFE is washed with pure water until the solution after the washing becomes neutral, and then heat-dried in vacuo at 110° C. or lower until the moisture is removed. Then, about 0.3 g of the dried PTFE is immersed in 30 mL of a saturated NaCl aqueous solution at 25° C. and left stirring for 30 minutes. Next, the protons in the saturated NaCl aqueous solution are subjected to neutralization titration using a 0.01 N solution of sodium hydroxide in water with a phenolphthalein indicator. The neutralization provides PTFE including a sodium ion as the counterion for the ion-exchange group. This PTFE is rinsed with pure water, and then vacuum-dried and weighed. The equivalent weight EW (g/eq) is then determined by the following formula:

$$EW=(W/M)-22$$

wherein M (mmol) represents the amount of the sodium hydroxide used for neutralization and W (mg) represents the mass of the PTFE including a sodium ion as the counterion for the ion-exchange group.

The PTFE is preferably substantially free from, more preferably completely free from, a monomer unit based on a reactive compound having a hydrophilic group and a functional group that is reactive in radical polymerization. The PTFE is preferably one obtained in the absence of a reactive compound having a hydrophilic group and a functional group that is reactive in radical polymerization. Examples of the reactive compound include those disclosed in JP 2010-183064 A. Use of the above reactive compound may impair excellent physical properties of PTFE.

The PTFE powder can suitably be used as, for example, additives for modifying molding materials, inks, cosmetics, coating materials, grease, parts of office automation devices, and toners; and additives for plating solutions. Examples of the molding materials include engineering plastics such as polyoxybenzoyl polyester, polyimide, polyamide, polyamide-imide, polyacetal, polycarbonate, and polyphenylene sulfide. The PTFE powder is particularly suitable as a thickener for grease.

The PTFE powder can suitably be used as additives for molding materials for the purposes of, for example, improving non-stickiness and sliding properties of rollers for copying devices; improving the texture of engineering plastic molded products, such as surface sheets of furniture, dashboard of automobiles, and covers of consumer electrical appliances; and improving the smoothness and abrasion resistance of machine parts generating mechanical friction, such as light-load bearings, gears, cams, buttons of touchtone phones, movie projectors, camera parts, and sliding parts. Also, they can suitably be used as processing aids for engineering plastics.

The PTFE powder can be used as additives for coating materials for the purpose of improving the smoothness of varnish and paint. The PTFE powder can be used as additives for cosmetics for the purpose of, for example, improving the smoothness of cosmetics such as foundation.

The PTFE powder can also be suitably used for the purpose of improving the oil or water repellency of articles such as wax and of improving the smoothness of grease and toners.

The PTFE powder can also be used as, for example, electrode binders for secondary batteries and fuel cells, hardness adjusters for electrode binders, and water-repellents for electrode surfaces.

Grease can be prepared from the PTFE powder and a lubricant. The grease characteristically contains the PTFE powder and a lubricant. Thus, the PTFE powder is uniformly stably dispersed in the lubricant, and the grease has excellent properties such as load bearing, electric insulation, and low hygroscopicity.

The lubricant (base oil) may be either mineral oil or synthetic oil. Examples of the lubricant (base oil) include paraffin- or naphthene-type mineral oil and synthetic oil such as synthetic hydrocarbon oil, ester oil, fluorinated oil, and silicone oil. In view of the heat resistance, fluorinated oil is preferred. Examples of the fluorinated oil include perfluoropolyether oil and a low-molecular-weight polymer of chlorotrifluoroethylene. The low-molecular-weight polymer of chlorotrifluoroethylene may have a weight average molecular weight of 500 to 1200.

The grease may further contain a thickener. Examples of the thickener include metallic soaps composite metallic soaps, bentonite, phthalocyanine, silica gel, urea compounds, urea-urethane compounds, urethane compounds, and imide compounds. Examples of the metallic soaps include sodium soap, calcium soap, aluminum soap, and lithium soap. Examples of the urea compounds, urea-urethane compounds, and urethane compounds include diurea compounds, triurea compounds, tetraurea compounds, other polyurea compounds, urea-urethane compounds, diurethane compounds, and mixtures thereof.

The grease preferably contains 0.1 to 50 mass %, more preferably 0.5 mass % or more and 30 mass % or less, of the PTFE powder. Too large an amount of the PTFE powder may make the grease too hard, causing a failure in exerting sufficient lubrication. Too small an amount of the PTFE powder may cause a failure in exerting the sealability.

The grease may further contain a solid lubricant, an extreme-pressure agent, an antioxidant, an oily agent, an anticorrosive, a viscosity index improver, a detergent dispersant, and others.

The PTFE powder may be produced by a method including emulsion polymerizing tetrafluoroethylene alone or tetrafluoroethylene and a modifying monomer copolymerizable with the tetrafluoroethylene in an aqueous medium in the presence of a chain-transfer agent, a fluorosurfactant having Log POW of 3.4 or lower, and a polymerization initiator, and providing PTFE powder from the resulting aqueous dispersion containing PTFE particles, wherein the fluorosurfactant is used in an amount corresponding to 4,600 to 500,000 ppm of the aqueous medium.

In order to obtain a PTFE powder having a large specific surface area, which is one feature of the present invention, a polymerization step for providing an aqueous dispersion is important. Use of a large amount of a fluorosurfactant having Log POW within a specific range in the above polymerization can provide an aqueous dispersion containing a PTFE powder having a large specific surface area. This is found by the present inventors.

Log POW is a 1-octanol/water partition coefficient which is represented by Log P (wherein P is the ratio between the concentration of the fluorosurfactant in octanol and that in water in a phase-separated octanol/water (1:1) liquid mixture containing the fluorosurfactant). Log POW is preferably 1.5 or higher. For easy removal of the surfactant from the PTFE, Log POW is preferably 3.0 or lower, more preferably 2.8 or lower.

Log POW is determined as follows. Specifically, HPLC is performed on standard substances (heptanoic acid, octanoic acid, nonanoic acid, and decanoic acid) each having a known octanol/water partition coefficient using TOSOH ODS-120T (φ4.6 mm×250 mm, Tosoh Corp.) as a column and acetonitrile/0.6 mass % HClO$_4$ aqueous solution (=1/1 (vol/vol %)) as an eluent at a flow rate of 1.0 ml/min, a sample amount of 300 μL, and a column temperature of 40° C.; with a detection light of UV 210 nm. For each standard substance, a calibration curve is drawn with respect to the elution time and the known octanol/water partition coefficient. Based on this calibration curve, Log POW is calculated from the elution time of the sample liquid in HPLC.

The fluorosurfactant having Log POW of 3.4 or lower is preferably an anionic fluorosurfactant, and examples thereof include those described in US 2007/0015864, US 2007/0015865, US 2007/0015866, US 2007/0276103, US 2007/0117914, US 2007/142541, US 2008/0015319, U.S. Pat. Nos. 3,250,808, 3,271,341, JP 2003-119204 A, WO 2005/042593, WO 2008/060461, WO 2007/046377, WO 2007/119526, WO 2007/046482, and WO 2007/046345.

The fluorosurfactant having Log POW of 3.4 or lower is preferably an anion surfactant.

The anion surfactant is preferably a carboxylic acid surfactant or a sulfonic acid surfactant, for example. Examples of these surfactants include those containing a perfluorocarboxylic acid (I) represented by the following formula (I), a ω-H perfluorocarboxylic acid (II) represented by the following formula (II), a perfluoropolyether carboxylic acid (III) represented by the following formula (III), a perfluoroalkyl alkylene carboxylic acid (IV) represented by the following formula (IV), a perfluoroalkoxy fluorocarboxylic acid (V) represented by the following formula (V), a perfluoroalkyl sulfonic acid (VI) represented by the following formula (VI), and/or a perfluoroalkyl alkylene sulfonic acid (VII) represented by the following formula (VII).

The perfluorocarboxylic acid (I) is represented by the following formula (I):

$$F(CF_2)_{n1}COOM \qquad (I)$$

wherein n1 is an integer of 3 to 6; and M is H, NH$_4$, or an alkali metal element.

In the formula (I), the lower limit of n1 is preferably 4 in view of the stability of the polymerization reaction. In order to make the fluorosurfactant less likely to remain during processing of the resulting PTFE aqueous dispersion, M is preferably NH$_4$.

For example, the perfluorocarboxylic acid (I) is preferably F(CF$_2$)$_6$COOM, F(CF$_2$)$_5$COOM, or F(CF$_2$)$_4$COOM, where M is defined as mentioned above.

The ω-H perfluorocarboxylic acid (II) is represented by the following formula (II):

$$H(CF_2)_{n2}COOM \qquad (II)$$

wherein n2 is an integer of 4 to 8; and M is defined as mentioned above.

In the formula (II), the upper limit of n2 is preferably 6 in view of the stability in the polymerization reaction. In order to make the fluorosurfactant less likely to remain during processing of the resulting PTFE aqueous dispersion, M is preferably NH$_4$.

For example, the ω-H perfluorocarboxylic acid (II) is preferably H(CF$_2$)$_8$COOM, H(CF$_2$)$_7$COOM, H(CF$_2$)$_6$COOM, H(CF$_2$)$_5$COOM, or H(CF$_2$)$_4$COOM, where M is defined as mentioned above.

The perfluoropolyether carboxylic acid (III) is represented by the following formula (III):

$$Rf^1—O—(CF(CF_3)CF_2O)_{n3}CF(CF_3)COOM \qquad (III)$$

wherein Rf$^1$ is a C1-C5 perfluoroalkyl group; n3 is an integer of 0 to 3; and M is defined as mentioned above.

In the formula (III), Rf$^1$ is preferably a perfluoroalkyl group having four or less carbon atoms in view of the stability in the polymerization, and n3 is preferably 0 or 1. In order to make the fluorosurfactant less likely to remain during processing of the resulting PTFE aqueous dispersion, M is preferably NH$_4$.

The perfluoropolyether carboxylic acid (III) is preferably C$_4$F$_9$OCF(CF$_3$) COOM, C$_3$F$_7$OCF(CF$_3$) COOM, C$_2$F$_5$OCF(CF$_3$) COOM, CF$_3$OCF(CF$_3$) COOM, or CF$_3$OCF(CF$_3$)CF$_2$OCF(CF$_3$)COOM, where M is defined as mentioned above. For good stability in the polymerization and good removing efficiency, it is more preferably CF$_3$OCF(CF$_3$)COOM or CF$_3$OCF(CF$_3$)CF$_2$OCF(CF$_3$)COOM, where M is defined as mentioned above.

The perfluoroalkyl alkylene carboxylic acid (IV) is represented by the following formula (IV):

$$Rf^2(CH_2)_{n4}Rf^3COOM \qquad (IV)$$

wherein Rf$^2$ is a C1-C5 perfluoroalkyl group; Rf$^3$ is a C1-C3 linear or branched perfluoroalkylene group; n4 is an integer of 1 to 3; and M is defined as mentioned above.

In the formula (IV), Rf$^2$ is preferably a perfluoroalkyl group having two or more carbon atoms or perfluoroalkyl group having four or less carbon atoms. Rf$^3$ is preferably a C1 or C2 perfluoroalkylene group, more preferably —(CF$_2$)— or —CF(CF$_3$)—. Further, n4 is preferably 1 or 2, more preferably 1. In order to make the fluorosurfactant less likely to remain during processing of the resulting PTFE aqueous dispersion, M is preferably NH$_4$.

For example, the perfluoroalkyl alkylene carboxylic acid (IV) is preferably C$_4$F$_9$CH$_2$CF$_2$COOM, C$_3$F$_7$CH$_2$CF$_2$COOM, C$_2$F$_5$CH$_2$CF$_2$COOM, C$_4$F$_9$CH$_2$CF(CF$_3$)COOM, C$_3$F$_7$CH$_2$CF(CF$_3$)COOM, C$_2$F$_5$CH$_2$CF(CF$_3$)COOM, C$_4$F$_9$CH$_2$CH$_2$CF$_2$COOM, C$_3$F$_7$CH$_2$CH$_2$CF$_2$COOM, or C$_2$F$_5$CH$_2$CH$_2$CF$_2$COOM, where M is defined as mentioned above.

The perfluoroalkoxy fluorocarboxylic acid (V) is represented by the following formula (V):

$$Rf^4—O—CY^1Y^2CF_2—COOM \qquad (V)$$

wherein Rf$^4$ is a C1-C5 perfluoroalkyl group; Y$^1$ and Y$^2$ may be the same as or different from each other, and are each H or F; and M is defined as mentioned above.

In the formula (V), Rf$^4$ is preferably a C1-C3 perfluoroalkyl group, more preferably a C3 perfluoroalkyl group, in view of the polymerization stability. In order to make the fluorosurfactant less likely to remain during processing of the resulting PTFE aqueous dispersion, M is preferably NH$_4$.

The perfluoroalkoxy fluorocarboxylic acid (V) is preferably C$_3$F$_7$OCH$_2$CF$_2$COOM, C$_3$F$_7$OCHFCF$_2$COOM, or C$_3$F$_7$OCF$_2$CF$_2$COOM, where M is defined as mentioned above.

The perfluoroalkyl sulfonic acid (VI) is represented by the following formula (VI):

$$F(CF_2)_{n5}SO_3M \qquad (VI)$$

wherein n5 is an integer of 3 to 6; and M is defined as mentioned above.

In the formula (VI), n5 is preferably an integer of 4 or 5 in view of the polymerization stability. In order to make the fluorosurfactant less likely to remain during processing of the resulting PTFE aqueous dispersion, M is preferably $NH_4$.

For example, the perfluoroalkyl sulfonic acid (VI) is preferably $F(CF_2)_4SO_3M$ or $F(CF_2)_5SO_3M$, where M is defined as mentioned above.

The perfluoroalkyl alkylene sulfonic acid (VII) is represented by the following formula (VII):

$$Rf^5(CH_2)_{n6}SO_3M \tag{VII}$$

wherein $Rf^5$ is a 1 to 6 perfluoroalkyl group; n6 is an integer of 1 to 3; and M is defined as mentioned above.

In the formula (VII), $Rf^5$ is preferably a C1-C3 perfluoroalkyl group, more preferably a C3 perfluoroalkyl group. Further, n6 is preferably 1 or 2, more preferably 1. In order to make the fluorosurfactant less likely to remain during processing of the resulting PTFE aqueous dispersion, M is preferably $NH_4$.

For example, the perfluoroalkyl alkylene sulfonic acid (VII) is preferably $C_3F_7CH_2SO_3M$ or $C_6F_{13}(CH_2)_2SO_3M$, where M is defined as mentioned above. For good stability in the polymerization and good removing efficiency, it is more preferably $C_3F_7CH_2SO_3M$ where M is defined as mentioned above.

The fluorosurfactant having Log POW of 3.4 or lower is preferably at least one selected from the group consisting of: fluorine-containing compounds represented by the following formula (1):

$$X—(CF_2)_{m1}—Y \tag{1}$$

(wherein X is H or F; m1 is an integer of 3 to 5; and Y is $—SO_3M$, $—SO_4M$, $—SO_3R$, $—SO_4R$, $—COOM$, $—PO_3M_2$, or $—PO_4M_2$, where M is H, $NH_4$, or an alkali metal and R is a C1-C12 alkyl group); the ω-H perfluorocarboxylic acids (II) represented by the formula (II); the perfluoropolyether carboxylic acids (III) represented by the formula (III); the perfluoroalkyl alkylene carboxylic acids (IV) represented by the formula (IV); the perfluoroalkoxy fluorocarboxylic acids (V) represented by the formula (V); and the perfluoroalkyl alkylene sulfonic acid (VII) represented by the formula (VII).

The fluorosurfactant having Log POW of 3.4 or lower is more preferably at least one selected from the group consisting of: the fluorine-containing compounds represented by the following formula (1):

$$X—(CF_2)_{m1}—Y \tag{1}$$

(wherein X is H or F; m1 is an integer of 3 to 5; and Y is $—SO_3M$, $—SO_4M$, $—SO_3R$, $—SO_4R$, $—COOM$, $—PO_3M_2$, or $—PO_4M_2$, where M is H, $NH_4$, or an alkali metal and R is a C1-C12 alkyl group); fluorine-containing compounds represented by the following formula (3):

$$CF_3OCF(CF_3)CF_2OCF(CF_3)COOX \tag{3}$$

(wherein X is a hydrogen atom, $NH_4$, or an alkali metal atom); fluorine-containing compounds represented by the following formula (4):

$$CF_3CF_2OCF_2CF_2OCF_2COOX \tag{4}$$

(wherein X is a hydrogen atom, $NH_4$, or an alkali metal atom); and fluorine-containing compounds represented by the following formula (5):

$$CF_3OCF_2CF_2OCF_2COOX \tag{5}$$

(wherein X is a hydrogen atom, $NH_4$, or an alkali metal atom).

The fluorosurfactant having Log POW of 3.4 or lower is still more preferably a fluorine-containing compound represented by the following formula (1):

$$X—(CF_2)_{m1}—Y \tag{1}$$

(wherein X is H or F; m1 is an integer of 3 to 5; and Y is $—SO_3M$, $—SO_4M$, $—SO_3R$, $—SO_4R$, $—COOM$, $—PO_3M_2$, or $—PO_4M_2$, where M is H, $NH_4$, or an alkali metal and R is a C1-C12 alkyl group).

The amount of the fluorosurfactant used in the above method corresponds to 4,600 to 500,000 ppm of the aqueous medium. Too small an amount of the fluorosurfactant may fail to give an aqueous dispersion containing PTFE particles having a small volume average particle size. Too large an amount thereof may fail to give the effects corresponding to the amount, causing economic disadvantages. The amount of the fluorosurfactant is preferably 6,000 ppm or more, more preferably 8,000 ppm or more, still more preferably 18,000 ppm or more, further more preferably 20,000 ppm or more, much more preferably more than 40,000 ppm, while preferably 400,000 ppm or less, more preferably 300,000 ppm or less.

The polymerization initiator used in the above method may be any initiator capable of generating radicals within the above range of the polymerization temperature, and any known oil-soluble and/or water-soluble polymerization initiator can be used. Further, the initiator may be combined with a reducing agent to form a redox agent, for example, to start the polymerization. The concentration of the polymerization initiator can appropriately be determined in accordance with the types of the monomers, the target molecular weight of a polymer, and the reaction rate.

The polymerization initiator is preferably at least one selected from the group consisting of persulfates and organic peroxides. In order to achieve good dispersion stability of the PTFE particles in the aqueous dispersion, the polymerization initiator may be any of persulfates such as ammonium persulfate and potassium persulfate and water-soluble organic peroxides such as disuccinic acid peroxide and diglutamic acid peroxide. Considering the handleability and the cost, ammonium persulfate is preferred.

The amount of the polymerization initiator can be appropriately determined in accordance with the MFR of the target PTFE. The amount of the polymerization initiator is usually 2 to 500 ppm relative to the whole amount of the aqueous medium. The upper limit thereof is more preferably 300 ppm, still more preferably 100 ppm. In order to achieve good dispersion stability of the PTFE particles in the aqueous dispersion, the amount of the polymerization initiator is preferably an amount corresponding to 2 ppm or more of the aqueous medium.

The aqueous medium used in the above method is a reaction medium in which the polymerization proceeds, and is a liquid that contains water. The aqueous medium may be any medium that contains water, and it may be one containing water and, for example, any of fluorine-free organic solvents such as alcohols, ethers, and ketones, and/or fluorinated organic solvents having a boiling point of 40° C. or lower.

The chain-transfer agent used in the above method may be a known one. Examples thereof include saturated hydrocarbons such as methane, ethane, propane, and butane; halogenated hydrocarbons such as chloromethane, dichloromethane, and difluoroethane; alcohols such as methanol and ethanol; and hydrogen. The chain-transfer agent is preferably one which is in the gas state at room temperature and atmospheric pressure, and more preferably ethane or propane.

The amount of the chain-transfer agent is usually 1 to 50,000 ppm, preferably 1 to 20,000 ppm, relative to the whole amount of the fluoromonomer supplied. The upper limit thereof is more preferably 10,000 ppm, still more preferably 7,000 ppm, further more preferably 2,000 ppm, whereas the lower limit thereof is more preferably 50 ppm, still more preferably 100 ppm.

Use of a large amount of the fluorosurfactant and a small amount of the chain-transfer agent is also one preferred condition of the above method. Such a condition enables easy production of PTFE particles having a high molecular weight and a small particle size.

A particularly preferred condition is to use 6,000 ppm or more of the fluorosurfactant and 20,000 ppm or less of the chain-transfer agent. In such a preferred condition, the amount of the fluorosurfactant is more preferably 8,000 ppm or more, still more preferably 18,000 ppm or more, particularly preferably 20,000 ppm or more, while preferably 400,000 ppm or less, more preferably 300,000 ppm or less. The amount of the chain-transfer agent is more preferably 10,000 ppm or less, still more preferably 7,000 ppm or less, further more preferably 2,000 ppm or less, while preferably 50 ppm or more, more preferably 100 ppm or more.

The chain-transfer agent may be added to a reactor at one time before the start of the polymerization, may be added in portions during the polymerization, or may continually be added during the polymerization.

The emulsion polymerization is preferably performed at 10° C. to 95° C., more preferably not lower than 30° C. but not higher than 90° C.

The emulsion polymerization is preferably performed at 0.05 to 3.9 MPaG, more preferably not lower than 0.1 MPaG but not higher than 3.0 MPaG.

The emulsion polymerization is performed as follows. Specifically, a fluoromonomer is put into a polymerization reactor. The contents of the reactor are stirred and the temperature in the reactor is maintained at a predetermined polymerization temperature. A polymerization initiator is added to the reactor to initiate the polymerization reaction. If necessary, components such as an aqueous medium and additives may be put into the reactor before the start of the polymerization reaction. The fluoromonomer, the polymerization initiator, and the chain-transfer agent may additionally be added in accordance with the respective purposes after the start of the polymerization reaction.

The emulsion polymerization in the above method is preferably performed in the absence of a fluorine-containing compound represented by the following formula (2):

X—(CF$_2$)$_{m2}$—Y    (2)

(wherein X is H or F; m2 is an integer of 6 or greater; and Y is —SO$_3$M, —SO$_4$M, —SO$_3$R, —SO$_4$R, —COOM, —PO$_3$M$_2$, or —PO$_4$M$_2$, where M is H, NH$_4$, or an alkali metal and R is a C1-C12 alkyl group). The above method can provide an aqueous dispersion containing PTFE particles having a sufficiently small volume average particle size even without such a conventional long-chain fluorosurfactant.

The emulsion polymerization in the above method is preferably performed in the absence of a reactive compound having a hydrophilic group and a functional group that is reactive in radical polymerization. The above method can provide an aqueous dispersion containing PTFE particles having a sufficiently small volume average particle size even without such a conventional reactive compound.

The above method further includes a step of providing a PTFE powder from the PTFE aqueous dispersion obtained in the above polymerization step. Since the PTFE aqueous dispersion contains PTFE particles having a small volume average particle size, it can provide a PTFE powder having a large specific surface area.

The PTFE powder may be obtained from the PTFE aqueous dispersion by coagulating the PTFE particles dispersed in the PTFE aqueous dispersion. Examples of common methods of coagulating the PTFE particles include a method of freezing a PTFE aqueous dispersion and a method of coagulating PTFE particles by mechanical shearing. In order to reduce the amount of a polymer remaining in the water phase after the coagulation, an electrolyte such as nitric acid, sulfuric acid, or ammonium nitrate is preferably added as a coagulating agent to the aqueous dispersion before the coagulation. If an acid is used as the electrolyte, the aqueous phase and the coagulated particles are preferably neutralized with an alkali such as sodium hydroxide or potassium hydroxide after the coagulation.

Then, in order to remove the fluorosurfactant, the coagulated particles are usually further washed with pure water. For an increased removing efficiency, the washing is preferably repeated multiple times.

The washing of the coagulated particles is followed by drying. Thereby, PTFE powder can be obtained.

EXAMPLES

Next, the present invention is described below referring to, but not limited to, examples.

The values in the examples are determined as follows.
(Volume Average Particle Size)

The volume average particle size is determined by dynamic light scattering (DLS). The dynamic light scattering (DLS) measurement was performed using ELSZ-1000S (Otsuka Electronics Co., Ltd.) at 25° C. A PTFE aqueous dispersion having a PTFE solid content of 1.0 mass % was used as a sample. The applied refractive index of the solvent (water) was 1.3328 and the viscosity of the solvent (water) was 0.8878 mPa·s. The measurement was performed using 660-nm laser as a light source and the light scattered from the sample was detected at 165° which is close to the backscattering angle. One measurement included 70 accumulations, and the data was imported over about 3 minutes. In accordance with the scattering intensity of the sample, the device automatically adjusted the intensity of the laser light applied to the sample and the position of measurement so as to give an optimal scattering intensity (10000 to 50000 cps).

Based on the resulting autocorrelation function, the ELSZ-1000 software provided the average particle size (d) and the polydispersity index (PI) by the Cumulant method adapted to the autocorrelation function. Still, the information regarding the particle size distribution is insufficient.

Thus, in order to obtain the particle size distribution, the histogram method was performed in which approximation is performed by causing a limited number of Γj to represent the distribution. The non-linear least squares method used in the approximation was a modified Marquardt method. The resulting particle size distribution is a distribution dependent to the scattering intensity, and thus converted into a weight distribution by the Rayleigh-Gans-Debye function. The average value in the weight distribution was defined as the weight average particle size. The specific gravity of the particles in the sample is identical regardless of the particle size. Thus, the weight average particle size is considered as equivalent to the volume average particle size.

(Specific Surface Area)

The specific surface area was measured using an automatic specific surface area measurement instrument (BEL-SORP-mini, Bel Japan, Inc.). In the measurement, an adsorption isotherm was obtained by nitrogen gas adsorption at the liquid nitrogen temperature. The isotherm was BST-analyzed, and thereby the specific surface area was determined.

Before the measurement, the sample was subjected to pretreatment; specifically, the sample was vacuum-deaerated at 100° C. for 10 hours using Belprep vac-II (Bel Japan, Inc.).

(Average Particle Size)

The particle size distribution was determined using a laser diffraction type particle size distribution analyzer (a product from Japan Laser Corp.) at a pressure of 0.1 MPa and a measurement time of three seconds without cascade impaction. The particle size corresponding to a value of 50% of the cumulative volume in the resulting particle size distribution was defined as the average particle size.

(Melt Flow Rate (MFR))

The mass (g/10 min) of the polymer flowed out of a nozzle (inner diameter: 2 mm, length: 8 mm) per 10 minutes using a melt indexer (Yasuda Seiki Seisakusho Ltd.) in conformity with ASTM D1238 at 380° C. and 5 kg load.

If the amount of the polymer flowed out was a very slight amount and was difficult to measure, it was regarded as 0.2 g/10 min or less.

(Melting Point)

The melting point was determined as a temperature corresponding to the local maximum on a heat-of-fusion curve obtained by heating 3 rag of a sample having no history of being heated up to 300° C. or higher using a differential scanning calorimeter (DSC) at a temperature-increasing rate of 10° C./min.

(Initial Pyrolysis Temperature)

The initial pyrolysis temperature was determined as a temperature at which the amount of a sample was reduced by 1 mass % when 10 mg of the sample was heated from room temperature at a temperature-increasing rate of 10° C/min using a thermogravimetric-differential thermal analysis (TG-DTA) device (trade name: TG/DTA6200, Seiko Instruments Inc.).

(Solid Content)

The solid content of the pre-condensation aqueous dispersion obtained by polymerization was a value corresponding to the proportion (in terms of percentage) of the mass of residue after heating (which was prepared by drying 1 g of the aqueous dispersion in a forced air oven at 300° C. for 60 minutes) relative to the mass (1 g) of the aqueous dispersion.

The solid content of the condensed PTFE aqueous dispersion was a value corresponding to the proportion (in terms of percentage) of the mass of residue after heating (which was prepared by drying 1 g of the aqueous dispersion in a forced air oven at 300° C. for 60 minutes) relative to the mass (1 g) of the aqueous dispersion.

(Evaluation of Dispersion Stability)

Grease (90 g) maintained at 100° C. was put into a glass graduated cylinder, and was maintained at this state for 48 hours. If oil separation was observed, the volume of the oil separation was measured by reading the scale on the graduated cylinder, and was expressed as a percentage relative to the whole grease volume. The lower the percentage is, the better the dispersion stability is.

Example 1

A 1-L glass reactor equipped with a stirrer was charged with 530 g of deionized water, 30 g of paraffin wax, and 49.5 g of an ammonium perfluorohexanoate (APFH) dispersant. Next, the contents of the reactor were heated up to 85° C. and sucked, and simultaneously the reactor was purged with a TEE monomer, thereby removing the oxygen in the reactor. Then, 0.03 g of ethane gas was added to the reactor, and the contents were stirred at 540 rpm. The TEE monomer was added to the reactor until the inner pressure reached 0.73 MPaG. An initiator prepared by dissolving 0.006 g of ammonium persulfate (APS) in 20 g of deionized water was charged into the reactor, and the pressure in the reactor was adjusted to 0.83 MPaG. The charging of the initiator was followed by a decrease in the pressure, which means that the start of the polymerization was observed. The TEE monomer was added to the reactor to maintain the pressure, and the polymerization was continued until about 140 g of the TFE monomer was consumed in the reaction. Thereafter, the gas in the reactor was discharged until the pressure reached normal pressure. The contents were then taken out of the reactor and cooled down. The supernatant paraffin wax was removed from the resulting PTFE aqueous dispersion.

The resulting PTFE aqueous dispersion had a solid content of 19.3 mass % and a volume average particle size of 3.2 nm.

Nitric acid was added to the resulting PTFE aqueous dispersion, and the mixture was vigorously stirred until coagulation occurred. The resulting coagulum was washed with deionized water, and then dried at 150° C. Thereby, PTFE powder was obtained. This PTFE powder had an average particle size of 27 µm, a specific surface area of 37.1 $m^2/g$, a MFR of 0 g/10 min, a melting point of 330.9° C., and an initial pyrolysis temperature at 1 mass % of 494.2° C.

To 20 g of the resulting PTFE powder was added 80 g of fluorinated oil (DEMNUM S-20, Daikin Industries, Ltd.). The mixture was stirred for two hours in a grinding mixer, providing grease.

Example 2

The polymerization was performed in the same manner as in Example 1 except that the amount of the ammonium perfluorohexanoate (APFH) dispersant was not 49.5 g as in Example 1 but 33.0 g.

Example 3

The polymerization was performed in the same manner as in Example 1 except that the amount of the ammonium persulfate (APS) initiator was not 0.006 g as in Example 1 but 0.110 g, and that the contents in the reactor was heated not up to 85° C. but up to 70° C.

Example 4

The polymerization was performed in the same manner as in Example 1 except that 49.5 q of the ammonium perfluorohexanoate (APFH) dispersant as in Example 1 was replaced by 10.5 g of an ammonium 2,3,3,3-tetrafluoro-2-[1,1,2,3,3,3-hexafluoro-2-(trifluoromethoxy)propoxy]-propanoate $(CF_3OCF(CF_3)CF_2OCF(CF_3)COONH_4)$ (PMPA) dispersant.

Example 5

A 1-L glass reactor equipped with a stirrer was charged with 530 g of deionized water, 30 g of paraffin wax, and 22.0 g of an ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant. Next, the contents of the reactor were heated up to 70° C. and sucked, and simultaneously the reactor was purged with a TFE monomer, thereby removing the oxygen in the reactor. Then, 0.03 g of ethane gas and 1.12 g of perfluoro [3-(1-methyl-2-vinyloxy-ethoxy)propionitrile] (CNVE) were added to the reactor, and the contents were stirred at 540 rpm. The TFE monomer was added to the reactor until the inner pressure reached 0.73 MPaG. An initiator prepared by dissolving 0.110 g of ammonium persulfate (APS) in 20 g of deionized water was charged into the reactor, and the pressure in the reactor was adjusted to 0.83 MPaG. The charging of the initiator was followed by a decrease in the pressure, which means that the start of the polymerization was observed. The TEE monomer was added to the reactor to maintain the pressure, and the polymerization was continued until about 140 g of the TFE monomer was consumed in the reaction. Thereafter, the gas in the reactor was discharged until the pressure reached normal pressure. The contents were then taken out of the reactor and cooled down. The supernatant paraffin wax was removed from the resulting PTFE aqueous dispersion.

The resulting PTFE aqueous dispersion had a solid content of 20.7 mass % and a volume average particle size of 0.9 nm.

Nitric acid was added to the resulting PTFE aqueous dispersion, and the mixture was vigorously stirred until coagulation occurred. The resulting coagulum was washed with deionized water, and then dried at 150° C. Thereby, PTFE powder was obtained. This PTFE powder had an average particle size of 15 μm, a specific surface area of 44.1 m²/g, a MFR of 0 g/10 min, a CNVE-modified amount of 0.62 mol %, a melting point of 329.2° C., and an initial pyrolysis temperature at 1 mass % of 450.4° C.

Comparative Example 1

The polymerization was performed in the same manner as in Example 1 except that 49.5 g of the ammonium perfluorohexanoate (APFH) dispersant as in Example 1 was replaced by 8.8 g of an ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant, and the polymerization was continued until about 40 g of the TFE monomer was consumed in the reaction.

Table 1 and Table 2 show the polymerization conditions and the evaluation results on the PTFE aqueous dispersions in the respective examples.

TABLE 1

| | Temperature ° C. | Pressure MPaG | Initiator Type | Initiator Amount ppm | Emulsifier Type | Emulsifier Amount ppm | Modifier Type | Modifier Amount ppm | Chain-transfer agent Type | Chain-transfer agent Amount ppm |
|---|---|---|---|---|---|---|---|---|---|---|
| Example 1 | 85 | 0.83 | APS | 11 | APFH | 90,000 | — | — | Ethane | 228 |
| Example 2 | 85 | 0.83 | APS | 11 | APFH | 60,000 | — | — | Ethane | 221 |
| Example 3 | 70 | 0.83 | APS | 200 | APFH | 90,000 | — | — | Ethane | 212 |
| Example 4 | 85 | 0.83 | APS | 11 | PMPA | 19,091 | — | — | Ethane | 748 |
| Example 5 | 70 | 0.83 | APS | 200 | PMPA | 40,000 | CNVE | 2036 | Ethane | 209 |
| Comparative Example 1 | 85 | 0.83 | APS | 11 | PMPA | 16,000 | — | — | Ethane | 736 |

TABLE 2

| | Volume average particle size nm | MFR g/10 min | Modifier Type | Modifier Amount mol % | Melting point ° C. | Initial pyrolysis temperature ° C. | Solid content mass % | Specific surface area m²/g | Average particle size μm | Dispersion stability (Amount of oil separation) vol % |
|---|---|---|---|---|---|---|---|---|---|---|
| Example 1 | 3.2 | 0.2 g or less | — | — | 330.9 | 494.2 | 19.3 | 37.1 | 27 | 0.0 |
| Example 2 | 11.4 | 0.2 g or less | — | — | 328.9 | 494.9 | 19.8 | 34.2 | 16 | 0.0 |
| Example 3 | 2.2 | 6.3 | — | — | 328.5 | 477.5 | 20.5 | 41.2 | 15 | 0.0 |
| Example 4 | 15.3 | 0.2 g or less | — | — | 328.9 | 491.8 | 6.8 | 32.2 | 17 | 0.0 |
| Example 5 | 0.9 | 0 | CNVE | 0.62 | 329.2 | 450.4 | 20.7 | 44.1 | 15 | 0.0 |
| Comparative Example 1 | 109.7 | 0.2 g or less | — | — | 328.0 | 492.6 | 6.9 | 14.6 | 21 | 3.5 |

The invention claimed is:

1. A polytetrafluoroethylene powder comprising:
polytetrafluoroethylene containing a tetrafluoroethylene unit alone or a tetrafluoroethylene unit and a modifying monomer unit based on a modifying monomer copolymerizable with the tetrafluoroethylene,
the powder having a specific surface area of 32 m²/g or larger, and
the powder being formed from polytetrafluoroethylene particles having a volume average particle size of 50 nm or smaller.

2. The polytetrafluoroethylene powder according to claim 1, wherein the specific surface area is 35 m²/g or larger.

3. The polytetrafluoroethylene powder according to claim 1, which is formed from polytetrafluoroethylene particles having a volume average particle size smaller than 20 nm.

4. The polytetrafluoroethylene powder according to claim 1, having a specific surface area of 40 m²/g or larger.

5. The polytetrafluoroethylene powder according to claim 1, which is formed from polytetrafluoroethylene particles having a volume average particle size of 0.1 nm to 50 nm.

6. The polytetrafluoroethylene powder according to claim 1, having an average particle size of 1 to 50 μm.

7. A polytetrafluoroethylene powder comprising:
polytetrafluoroethylene containing a tetrafluoroethylene unit alone or a tetrafluoroethylene unit and a modifying monomer unit based on a modifying monomer copolymerizable with the tetrafluoroethylene,
the powder having a specific surface area of 32 m²/g or larger, and being formed from polytetrafluoroethylene particles having a volume average particle size of 50 nm or smaller,
said polytetrafluoroethylene powder being produced by a method including emulsion polymerizing tetrafluoroethylene alone or tetrafluoroethylene and a modifying monomer copolymerizable with the tetrafluoroethylene in an aqueous medium in the presence of a chain-transfer agent, a fluorosurfactant having LogPOW of 3.4 or lower, and a polymerization initiator to obtain an aqueous dispersion containing polytetrafluoroethylene particles, and coagulating the polytetrafluoroethylene particles to recover polytetrafluorooethylene powder from the resulting aqueous dispersion containing polytetrafluorooethylene particles, wherein the fluorosurfactant is used in an amount corresponding to 4,600 to 500,000 ppm of the aqueous medium.

8. The polytetrafluoroethylene powder according to claim 7, wherein the fluorosurfactant is an anionic surfactant.

9. The polytetrafluoroethylene powder according to claim 7, wherein the fluorosurfactant is used in an amount corresponding to 4,600 to 300,000 ppm of the aqueous medium.

10. The polytetrafluoroethylene powder according to claim 7, wherein the chain-transfer agent is used in an amount of 1 to 20,000 ppm relative to a whole amount of fluoromonomer supplied in the emulsion polymerizing.

11. The polytetrafluoroethylene powder according to claim 7, wherein the chain-transfer agent is used in an amount of 1 to 2,000 ppm relative to a whole amount of fluoromonomer supplied in the emulsion polymerizing.

12. The polytetrafluoroethylene powder according to claim 7, wherein the fluorosurfactant is used in an amount corresponding to 6,000 to 300,000 ppm of the aqueous medium and the chain-transfer agent is used in an amount of 100 to 10,000 ppm relative to a whole amount of fluoromonomer supplied in the emulsion polymerizing.

13. The polytetrafluoroethylene powder according to claim 7, wherein the fluorosurfactant is used in an amount corresponding to 6,000 to 300,000 ppm of the aqueous medium, the chain-transfer agent is used in an amount of 100 to 10,000 ppm relative to a whole amount of fluoromonomer supplied in the emulsion polymerizing, the fluorosurfactant is an anionic surfactant and the chain-transfer agent comprises a saturated hydrocarbon or an alcohol.

14. The polytetrafluoroethylene powder according to claim 7, wherein the chain-transfer agent comprises ethane or propane.

15. The polytetrafluoroethylene powder according to claim 7, having a specific surface area of 40 m²/g or larger.

16. The polytetrafluoroethylene powder according to claim 7, which is formed from polytetrafluoroethylene particles having a volume average particle size of 0.1 nm to 50 nm.

17. The polytetrafluoroethylene powder according to claim 7, having an average particle size of 1 to 50 μm.

* * * * *